United States Patent [19]

Gilligan

[11] Patent Number: 4,969,735

[45] Date of Patent: Nov. 13, 1990

[54] PASSIVE RANGE FINDING APPARATUS UTILIZING TELEVISION SENSORS

[75] Inventor: Lawrence H. Gilligan, Charlottesville, Va.

[73] Assignee: Sperry Marine Inc., Charlottesville, Va.

[21] Appl. No.: 320,010

[22] Filed: Mar. 7, 1989

[51] Int. Cl.$^5$ .......................... G01C 3/08; G01C 3/14; H04N 7/18

[52] U.S. Cl. ......................................... 356/4; 356/12; 358/88; 358/107; 382/1

[58] Field of Search ............................. 356/1,4, 9, 12; 250/558; 358/88, 107; 382/1

[56] References Cited

U.S. PATENT DOCUMENTS

| | | | |
|---|---|---|---|
| 2,786,096 | 3/1957 | Palmer | 356/9 |
| 4,341,447 | 7/1982 | Biber | 356/4 X |
| 4,396,945 | 8/1983 | DiMatteo et al. | 358/107 |
| 4,556,986 | 12/1985 | Craig | 358/88 X |
| 4,589,770 | 5/1986 | Jones et al. | 356/1 |
| 4,601,053 | 7/1986 | Grumet | 356/12 X |
| 4,606,630 | 8/1986 | Haruki et al. | 356/1 |
| 4,635,203 | 1/1987 | Merchant | 358/1 X |

FOREIGN PATENT DOCUMENTS 2097215  10/1982  United Kingdom ................ 358/107

*Primary Examiner*—Thomas H. Tarcza
*Assistant Examiner*—Linda J. Wallace
*Attorney, Agent, or Firm*—Seymour Levine

[57] ABSTRACT

The range to an object is obtained by conveying light rays from the object through an afocal telescope to spatially displaced objective lenses that view the scene from two displaced points of view. The scene images from the objective lenses are focussed on two television sensors, respectively. The video frame from the TV sensors are digitized and stored in respective frame grabbers. A timing and logic circuit controls the television sensors and frame grabbers to alternately provide frames from the two television sensors to a monitor. The timing and logic circuit time shifts the output of one of the frame grabbers with respect to the output of the other frame grabber. A correlator responsive to the frame grabber outputs provides the correlation therebetween. The time shift required to bring the video images of the object into coincidence, at the correlation peak, provides a measure of the range to the object.

8 Claims, 1 Drawing Sheet

PASSIVE RANGE FINDING APPARATUS UTILIZING TELEVISION SENSORS

BACKGROUND OF THE INVENTION

1. Field of the Invention

The invention relates to range finding particularly with respect to passive optical range finding.

2. Description of the Prior Art

Active range finding apparatus is known in the prior art utilizing radar or laser technology. Although such apparatus measures range very accurately, the military use of such range finding devices exposes the user's position to an adversary by means of detection devices. It is a desideratum of the prior art to rapidly and accurately measure range to a target utilizing passive apparatus for such purposes as position calculation and fire control. It is also desirable that the passive apparatus occupy a reasonably small space for use in strategic applications such as in the periscope technology.

Range finding in the periscope technology traditionally utilizes a stadimeter or stadimetric reticles. In the stadimetric method, a target is identified and range is calculated from the known height of a target feature and the angle subtended thereby (angular subtense). The calculation utilizes the a priori knowledge of such target dimensional characteristics.

Another passive range finding technique involves the traditional parallax range finder. This traditional instrument, developed as a naval fire control range finder, views a target from two optical apertures. When the lines of sight of the two apertures are parallel, two images are observed. By varying the angle of one viewing aperture, coincidence of the images is effected and the angular variation of the one viewing aperture is a measure of target range. Thus, the parallax range finder utilizes the principle of triangulation or determining range by solving the triangle produced by the two view-points and the target.

On, for example, a naval battle cruiser, a "baseline" or distance between apertures of approximately 1 meter is required for accurate range measurements to the horizon (approximately 14 kilometers). This procedure has significant disadvantages since it involves an operator with the human limitation of visual acuity and also utilizes an inaccurate mechanically varied prism angle. Because of the limited human visual acuity and the inaccuracies of the mechanical device, the large baseline is required for reasonable range and accuracy. The relatively low resolution with which the operator could effect image coincidence made the large baseline necessary.

Both the parallax and stadimetric range finders require very well trained observers. The stadimeter, in particular, requires special skills and a reference library. Both methods require a significant amount of time to determine range, during which time the observer or the periscope is exposed.

SUMMARY OF THE INVENTION

The invention utilizes two spaced apart television sensors to provide respective images of a target. The sensors provide video data to storage devices, respectively. Correlation means responsive to the storage devices shifts the video data from one sensor with respect to the video data from the other sensor until image coincidence is obtained. The amount of shift required for image coincidence is inversely proportional to the range to the target.

In a preferred embodiment, the television sensors comprise two television solid-state image sensors with objective lenses to generate an image of the scene from two points of view. Preferably, the lines-of-sight of the sensors are parallel, and within a few centimeters. In the preferred embodiment, each sensor provides a frame of data to a digital storage device storing one frame of video data. Commercially available "frame-grabber" apparatus is utilized. The outputs of the frame-grabbers are applied to a monitor to display the images of the scene. A correlation processor shifts one of the frames laterally upon the display by means of a synchronizing time shift and the amount of shift required for image coincidence is inversely proportional to range. The correlation processor preferably automatically seeks the correlation peak to maintain image alignment, thus providing a continuous measurement of range. In a preferred embodiment of the invention, the sensitivity of the range finder is enhanced by utilizing an afocal lens prior to the two television sensors to magnify the angular differences of the two viewing angles.

DESCRIPTION OF THE PREFERRED EMBODIMENT

Figure 1:
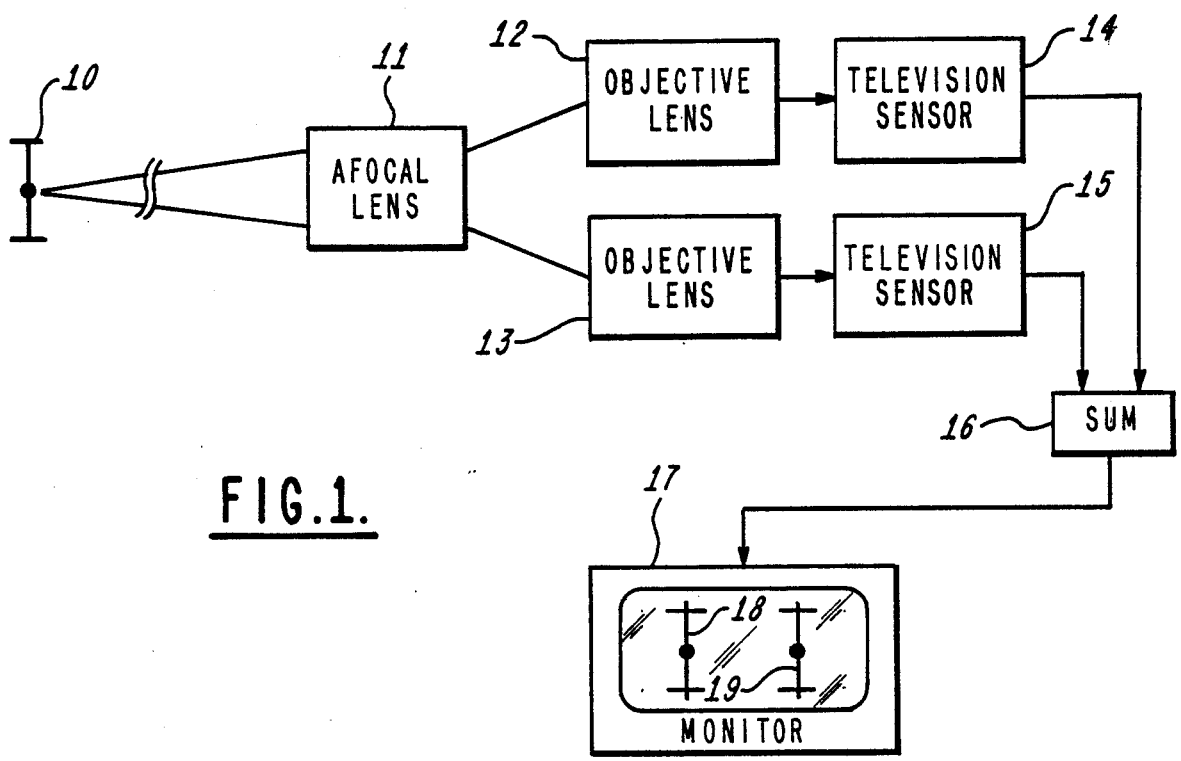
FIG. 1 is a schematic depiction of a parallax range finder illustrating the operation of the parallax viewing system utilizing precepts of the present invention.

Referring to FIG. 1, the range to an object 10 is desired. Light rays from the object 10 are transmitted through an afocal lens 11 to two spaced apart objective lenses 12 and 13. The objective lens 12 focusses an image on a television sensor 14 and the objective lens 13 focusses an image on a television sensor 15. If the video signals from the television sensor 14 and the television sensor 15 are combined in a summer 16 and applied to a monitor 17, two laterally displaced images 18 and 19 are displayed. The image 18 is produced by the television sensor 15 (left sensor image) and the image 19 is produced by the television sensor 14 (right sensor image).

Thus, the object 10 at a range to be measured, generates an image on a television sensor having a lateral position depending upon the position of the sensor with respect to the viewing lens aperture. The rays from the object toward the sensor have an angular deviation associated therewith. The angular deviation is magnified by the afocal lens 11, and the objective lenses 12 and 13 generate images of the object 10 upon the television sensors 14 and 15 as displayed on the monitor 17 having a lateral position therebetween that is a function of the angle at which the rays enter the objective lenses 12 and 13. Thus, it is appreciated that the displacement between the images 18 and 19, which are a function of horizontal television raster scan time, provides a measure of the range to the object 10.

Figure 2:
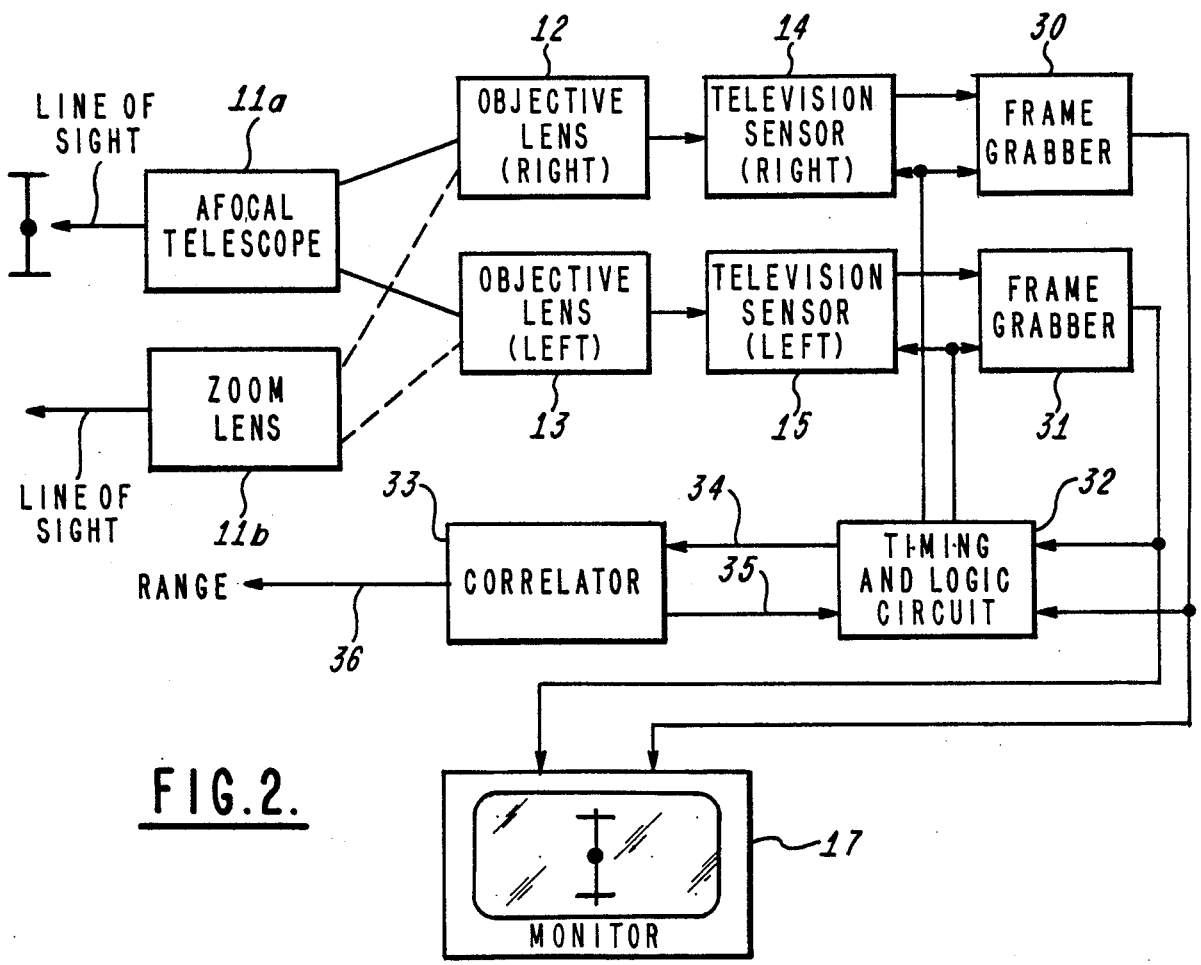
FIG. 2 is a schematic block diagram illustrating the range finder implemented in accordance with the present invention.

Referring to FIG. 2, in which like reference numerals indicate like components with respect to FIG. 1, a schematic block diagram of a range finder implemented in accordance with the present invention is illustrated. The afocal lens 11a is implemented by an afocal telescope which magnifies the angular subtense of the object 10. The objective lenses 12 and 13 generate images of the object 10 from two different viewpoints. In a convenional manner, the images from the lenses 12 and 13 are converted to electronic signals in TV frame format by television sensors 14 and 15. Preferably, the television sensors 14 and 15 are of present day commercially available solid state design, such as solid state charge coupled device focal plane array sensors, which achieve absolute geometric accuracy.

The outputs of the TV sensors 14 and 15 are applied to respective "frame grabbers" 30 and 31 which digitize and store each frame from the sensors 14 and 15. The frame grabbers 30 and 31 are commercially available components which digitize the television video signals from the sensors 14 and 15 and store one full video frame in digital format. Normally, the stored frame is destructively readout in serial form upon command. The stored frame may also be addressed non-destructively to perform image processing prior to display. The frame grabber is a digital memory, so that, after converting the electronic video signal from analog to digital, a digital number representing intensity is stored in a conventional computer-type memory. The memory is of a random access type, so that each picture element may be accessed as a datum point. The objective lens 12, television sensor 14 and frame grabber 30 and the objective lens 13, television sensor 15 and frame grabber 31 comprise respective television sensor channels.

The outputs of the frame grabbers 30 and 31 are applied to the monitor 17 as well as to a timing and logic circuit 32 which synchronizes the sensors 14 and 15 and the frame grabbers 30 and 31. The timing and logic circuit 32 provides an input to a correlator 33 on a path 34. The correlator 33 provides an input to the timing and logic circuit 32 on a path 35. The correlator 33 provides a signal on a path 36 representative of the range to the object 10. The timing and logic circuit 32 synchronizes the sensors 14 and 15 and the frame grabbers 30 and 31 to cause frames to be displayed upon the monitor 17 alternately from the right TV sensor 14 and the left TV sensor 15.

The timing and logic circuit 32 controls the frame grabbers 30 and 31 to simultaneously read the frame data from the right sensor 14 and the left sensor 15 in serial fashion and applies this serial data to the correlator 33. Since the data is read out serially, a timing delay will shift the image as displayed on the monitor 17. In a conventional manner, the correlator 33 successively shifts the timing until the two spatially displaced images appear in coincidence on the monitor 17. This is caused by the temporal displacement shift introduced by the correlator 33 and the timing and logic circuit 32. As is well understood in the art, the correlator 33 automatically provides the shifting and comparisons until a correlation maximum is achieved. The amount of shift required to obtain the correlation peak and to cause the laterally displaced images from the right and left sensors 14 and 15 to appear in coincidence on the monitor 17 is a measure of the range to the target 10. This range signal is provided on the path 36. Thus, the correlator 33 changes the timing within the timing and logic circuit 32 to attain the correlation peak and to cause the images on the monitor 17 to coincide. The change in timing is thus a measure of the range.

The operator may use a "window" to select the specific target for range measurement, if the scene which is being viewed contains object at various ranges (such as the foreground). The window is a digital processing function based on selecting the desired datum points in the random access memory. Such windowing is commonly used with frame grabber storage devices.

Although the invention was described in terms of automatic ranging by use of the correlator 33, it is appreciated that manual apparatus (not shown) may instead be utilized to shift the timing of the timing and logic circuit 32 to visually align the images on the monitor 17 so as to provide the measure of range. The amount of shift required to effect such coincidence provides the range reading.

It is appreciated from the foregoing that the two television sensors 14 and 15 with the associated objective lenses 12 and 13 generate identical images of the scene containing the target 10, except that the images are laterally displaced. For convenience, the displacement is described herein as lateral, or left/right. It is appreciated that any displacement, whether lateral, vertical, diagonal, or the like, may be utilized in practicing the invention. As described above, the present invention solves the conventional range triangle in the manner described. The spatially displacement between the images 18 and 19 (FIG. 1) represents one angle of the range triangle. Since the baseline distance is known, the required temporal displacement as obtained from the correlator 33 is utilized to solve the range triangle as described.

If the baseline between the objective lenses 12 and 13 is approximately 3 centimeters and the resolution of the TV sensors 14 and 15 is approximately 500 picture elements in the horizontal direction, such a system would provide reasonable accuracy to approximately 250 meters. By utilizing the afocal telescope 11 to magnify the apex angle of the range triangle, a range of at least 10 kilometers with reasonable accuracy is achieved. The afocal telescope 11a, although not absolutely necessary in practicing the invention, is a practical desirability to overcome space and resolution limitations. In a practical embodiment of the system, the afocal telescope 11a may be implemented by a zoom lens 11b in order to permit target acquisition prior to identification and range finding.

The present invention may advantageously be utilized in a periscope or similar remote sensor situation where the space available to accommodate the baseline between the left and right sensors is limited. It is appreciated that the system of FIG. 2 provides a television monitoring function as well as a range finding function since the correlator 33 and timing and logic circuit 32 maintain the displaced images of the scene in coincidence on the monitor 17. Thus, the range finding function in a TV monitor system is achieved by the addition of only one channel.

It is appreciated from the foregoing that the angle of incidence of a light ray from an object into the objective lens determines the lateral position of the image of the object on the image plane of the TV sensor. Present day image processors permit correlation of two images in television format to within one-sixteenth of the image picture element (pixel), the smallest resolvable element. Thus, the baseline of the optical range finder may be reduced to several centimeters and the operator is not required to perform the image position correlation. The ranging operation utilizing the apparatus of the present invention is performed in a fraction of a second. The present invention applies modern television image processing technology to the traditional range finding problem. The parallax range finder of the present invention implements the imaging operation and range measurement by means of the television sensor and rapid automatic calculation techniques as described above. Thus, the present invention solves the prior art problems of equipment size, operator skills, and exposure time. Effective television and automatic computer means to implement the invention as described above are presently commercially available.

While the invention has been described in its preferred embodiment, it is to be understood that the words which have been used are words of description rather thna limitation and that changes may be made within the purview of the appended claims without departing from the true scope and spirit of the invention in its broader aspects.

What is claimed is:

1. Range finding apparatus for passively finding the range to an object, comprising:
    afocal lens means for conveying light rays from said object,
    first and second spatially displaced television sensor channels positioned to receive light rays conveyed by said afocal lens means for providing first and second video signals representative of spatially displaced images of said object, respectively,
    shifting means for time shifting said second video signal with respect to said first video signal, and
    means coupled to said shifting means and to said first and second television sensor channels for determining a time shift at which said spatially displaced images of said object are in coincidence,
    said time shift providing a measure of said range to said object.

2. The apparatus of claim 1 wherein each of said first and second television sensor channels comprises:
    a television sensor,
    object lens means positioned to receive light conveyed by said afocal lens means for focussing an image thereof on said television sensor, and
    frame grabber means for storing a television frame from said television sensor in digital format and providing an output signal in accordance therewith, and wherein
    said output signal from said frame grabber means of said first television sensor channel provides said first video signal and said output signal from said frame grabber means of said second television sensor channel provides said second video signal, and
    said objective lens means of said first and second television sensor channels have said spatial displacement therebetween.

3. The apparatus of claim 2 wherein said shifting means for controlling said frame grabber means comprises,
    timing and logic circuit means for controlling said frame grabber means in order to effect said time shift between said first and second video signal, and
    correlator means responsive to said timing and logic circuit means and to said first and second video signals as shifted by said timing and logic circuit means for providing a correlation signal in accordance with said time shift in order to provide said measure of said range to said object.

4. The apparatus of claim 1 further including monitor means responsive to said first and second video signals for displaying said images of said object.

5. The apparatus of claim 3 further including monitor means responsive to said output signals of said first and second frame grabber means for displaying said images of said object.

6. The apparatus of claim 5 wherein said monitor means comprises means responsive to said timing and logic circuit means for alternately displaying stored television frames from said frame grabber means of said first and second television sensor channels.

7. The apparatus of claim 1 wherein said afocal lens means comprises an afocal telescope.

8. The apparatus of claim 1 wherein said afocal lens means comprises a zoom lens.

* * * * *